United States Patent
Kraus

(10) Patent No.: US 12,498,850 B2
(45) Date of Patent: Dec. 16, 2025

(54) METHOD AND DEVICE FOR INPUTTING A CHARACTER STRING

(71) Applicant: Brainbox GmbH, Pforzheim (DE)

(72) Inventor: Carsten Kraus, Pforzheim (DE)

(73) Assignee: BRAINBOX GMBH, Pforzheim (DE)

( * ) Notice: Subject to any disclaimer, the term of this patent is extended or adjusted under 35 U.S.C. 154(b) by 0 days.

(21) Appl. No.: 18/683,121

(22) PCT Filed: Aug. 16, 2022

(86) PCT No.: PCT/EP2022/072812
§ 371 (c)(1),
(2) Date: Feb. 12, 2024

(87) PCT Pub. No.: WO2023/017189
PCT Pub. Date: Feb. 16, 2023

(65) Prior Publication Data
US 2024/0345721 A1    Oct. 17, 2024

(30) Foreign Application Priority Data
Aug. 13, 2021 (DE) .......................... 102021121116.6

(51) Int. Cl.
*G06F 3/04886* (2022.01)
*G06F 3/041* (2006.01)
(Continued)

(52) U.S. Cl.
CPC ...... *G06F 3/04886* (2013.01); *G06F 3/04186* (2019.05); *G06F 40/166* (2020.01); *G06F 40/232* (2020.01)

(58) Field of Classification Search
CPC ............. G06F 3/04886; G06F 3/04186; G06F 40/166; G06F 40/232; G06F 3/0237
See application file for complete search history.

(56) References Cited

U.S. PATENT DOCUMENTS

| | | | |
|---|---|---|---|
| 9,798,393 B2 | 10/2017 | Neels et al. | |
| 2008/0167858 A1 | 7/2008 | Christie et al. | |

(Continued)

FOREIGN PATENT DOCUMENTS

| | | | | |
|---|---|---|---|---|
| CN | 103699233 A | | 4/2014 | |
| WO | WO-2007144199 A1 | * | 12/2007 | ....... G06F 17/30985 |
| WO | WO-2011113057 A1 | * | 9/2011 | ......... G06F 16/3322 |

OTHER PUBLICATIONS

International Search Report from corresponding International Patent Application No. PCT/EP22/72812, dated Dec. 21, 2022.

*Primary Examiner* — Towfiq Elahi
(74) *Attorney, Agent, or Firm* — RENNER, OTTO, BOISSELLE & SKLAR, LLP

(57) ABSTRACT

A method and device for inputting a character string, in which a plurality of selectable characters are displayed in input fields on a touchscreen, input positions are successively recorded on the touchscreen, and, in a first assignment, each input position is assigned to a displayed character, such that a first character string is recorded, and a correction character string is determined for the first character string. When determining the correction character string, a second assignment is carried out, in which at least one character of the first assignment is replaced by another character according to the second assignment, such that a second character string is generated. The selection of the other character according to the second assignment is carried out depending on the display position of the input field of the other character relative to the associated recorded input position, and the second character string is the correction character string.

10 Claims, 3 Drawing Sheets

(51) Int. Cl.
*G06F 40/166* (2020.01)
*G06F 40/232* (2020.01)

(56) References Cited

U.S. PATENT DOCUMENTS

2015/0067571 A1 3/2015 Marsden
2015/0324011 A1 11/2015 Czelnik et al.

* cited by examiner

METHOD AND DEVICE FOR INPUTTING A CHARACTER STRING

FIELD OF INVENTION

The present invention relates to a method for inputting a character string. In the method, a plurality of selectable characters are displayed in input fields on a touchscreen. Input positions are then successively recorded on the touchscreen, and, in a first assignment, each input position is assigned to a displayed character, such that a first character string is recorded. A correction character string is then determined. The invention further relates to a device for inputting a character string, having a touchscreen and an input unit coupled with the touchscreen. The input unit is designed to display a plurality of selectable characters in input fields on the touchscreen, and to successively record input positions on the touchscreen. A recording unit is coupled with the input unit, which is designed, in a first assignment, to assign each input position to a displayed character in order to record a first character string. The device further comprises a correction unit, which is designed to determine a correction character string.

BACKGROUND OF INVENTION

In order to support the user in inputting the character string, it is known to compare the recorded first character string with a set of permissible character strings. If, for example, the character string is a word of a particular language, the input character string according to the first assignment can be compared with permissible words of this language that are stored in a database. This method is in particular used when correcting spelling, where words which are written orthographically incorrectly are replaced by permissible, correctly-written words. The orthographically correctly-written word is then the permissible correction character string, which is then output as a suggestion. In a selection of the correction character string, the first character string recorded first is replaced by the correction character string.

In such known methods for correcting spelling, the problem arises that, in many cases, correction character strings are suggested which do not correspond to the input intention of the user.

SUMMARY OF INVENTION

The object on which the invention is based is thus to specify a method and a device of the kind specified in the introduction, which determine correction character strings that better correspond to the input intention of a user if it has been determined that the first character string is not a permissible character string.

This object is achieved according to the invention by a method having the features of the independent method claims and by a device having the features of independent device claims. Advantageous embodiments and developments result from the dependent claims.

Correspondingly, in a method according to the invention, when determining the correction character string, a second assignment is carried out, in which at least one character of the first assignment is replaced by another character according to the second assignment, such that a second character string is generated. The selection of the other character according to the second assignment is carried out depending on the display position of the input field of the other character relative to the associated recorded input position. The second character string is then the correction character string.

It has been determined that, in many cases, it is not an orthographically incorrect spelling of a character string that leads to an impermissible first character string, but rather that the user has not selected that input field to record the character to be selected which they intended to select.

In many devices which use a touchscreen to input characters, the selectable characters are displayed within input fields. The user can for example touch these input fields with their fingertip to select the character assigned to the input field for the character string to be input.

If the surface on which the input fields are displayed are relatively small, e.g., as in a smartphone, and if the input fields are thus also relatively small and arranged relatively densely next to one another, the problem results that the user may not exactly hit the desired input position on the touchscreen, and the character is erroneously selected. This problem also arises if the device is used in an environment in which acceleration forces are acting, as for example in the case of vibrations which arise in a use in a motor vehicle. In the event of such faulty inputs, a correction character string can be determined by the method according to the invention, said correction character string better corresponding to the input intention of the user.

In the method according to the invention, the recorded input position is set in relation to the display positions of the input fields and another character is determined from the latter, which replaces an originally assigned character in the first assignment. In this manner, erroneous inputs can be corrected, which are not based on lacking knowledge of the correct orthography of a character string, but rather are based on the fact that the user has for example typed next to the input field that they actually wanted to select.

An input field is in particular a surface on the touchscreen. Furthermore, however, the input field can also be a point on the touchscreen. An input field is characterised in that a character is assigned to this input field, which character is selected in the input. This character is usually displayed in connection with the input field. For example, the character can be reproduced on the touchscreen within the surface of the input field.

The input position is in particular the coordinates of the input on the two-dimensional touchscreen. An input region can then be recorded, which is for example formed by the region in which the user for example touches the touchscreen with their fingertip. An input position is then determined from this input region. This can for example be the geometric central point or the geometric centre of gravity of the recorded input region.

As an alternative, it is further possible that the user does not touch the touchscreen at all, for example with their finger, during the input, but rather, an interaction is recorded between the surface of the touchscreen and the fingertip and is assigned to an input position. This interaction can for example be a capacitive coupling, which then also makes it possible to record an input position if the user's fingertip only comes close to the touchscreen, but does not directly touch it. Such interactions are also comprised by a touchscreen in the context of the invention to record an input position.

In the method according to the invention, the input fields are arranged such that they form a keyboard in which the input fields are arranged very close to one another.

Via the method according to the invention, it is advantageously possible to better record the input intention of a user if an impermissible character string has been determined because the user has selected an incorrect input field, because, for example, very small input fields are located very close to one another, or because the input has been disrupted by forces which have led to movements of the touchscreen relative to the operating object for the input, for example relative to the fingertip of a user. In the method according to the invention, a correction character string can be determined from the arrangement of the recorded input position relative to the display positions of the input fields, said correction character string more closely resembling the input intention of the user in these cases.

However, even if the first character string is a permissible character string, it can be the case that this first character string is very unlikely, such that in this case too, the correction character string is determined in the method according to the invention. For example, the first character string can be a very rare word. It can further be the case that this word is very unlikely in the context of the sentence. In this case, only after one or more second character strings have been determined for the correction character string, can it be ascertained which character string is most likely to correspond to the intention of the user.

According to a different embodiment of the method according to the invention, it is checked whether the first character string is a permissible character string. The correction character string is only determined in this case when the result of the check is that the first character string is not a permissible character string. The method is thus advantageously accelerated, and the computing complexity is reduced.

According to a development of the method according to the invention, a similarity degree is respectively determined in a comparison of the first character string with checking character strings from a set of permissible character strings. In this case, when the second character string is compared with checking character strings from the set of permissible character strings, a similarity degree is further respectively determined. One of the checking character strings is then selected as a correction character string depending on the similarity degree, wherein the higher the similarity degree of the checking character string, the more likely this checking character string is to be selected as the correction character string. In particular, how the checking character string with the highest similarity degree of the correction character string selected. In some instances, however, further parameters can be taken into account when selecting the checking character string, as is explained later.

The set of permissible character strings can for example be words of a language which are for example stored in a thesaurus. In this case, the checking character strings are thus the words of a language. The first character string is preferably compared with the same checking character strings as the second character string.

When determining the similarity degree, methods known per se can be used to correct spelling. A spelling correction is thus carried out for the first character string. A spelling correction is further carried out for the second character string, wherein a similarity degree is respectively determined. The checking character string of the spelling correction having the highest similarity degree is then selected as the correction character string.

In conventional spelling correction methods, the problem results that a significant weight is placed on the position of a character in the character string. For example, if a relatively significant weight is placed on the recorded initial letter, the initial letter frequently may not be changed in the correction suggestion. Conventional methods for correcting spelling thus lead to unsuitable correction character strings if the initial letter has been incorrectly recorded. In this case, the word which the user intended to input is rarely suggested. Similar weightings can depend on whether the letter is a vowel or a consonant.

In the above embodiment of the method according to the invention, information about the recorded coordinates of the input position is taken into account. The second character string is determined depending on the arrangement of the input position relative to the display positions of the input fields. The same method is then applied, for example, for this second character string, for example for spelling correction, in order to determine a similarity degree. However, if, for example, the initial letter has been changed in the second character string because, for example, the input position for the input of the first character on the edge of the input field of the first character of the first character string was relatively close to another input field, the character of this other input field will replace the initial letters of the first character string in the second character string. Because of the significant weighting of the initial letter in the correction method with the second character string, this can advantageously lead a high similarity degree to be assigned to a checking character string which is more likely to correspond to the input intention of the user.

In this embodiment of the method according to the invention, it is thus not only one linguistic comparison of character strings which is carried out. The measurement of the input position and the geometric arrangement of input fields is rather taken into account on the touchscreen when generating the correction character string. When these measurements are taken into account, this leads to an improved correction character string.

As an alternative, the similarity degree can also be determined in another manner. For example, the method described in WO 2007/144199 A1 can be used to automatically evaluate the similarity of two character strings, in order to determine the similarity degree of the first character string with the respective checking character strings and of the second character string with the respective checking character strings.

In this embodiment of the method according to the invention, a character is thus replaced, and it is checked whether a similar checking character string is obtained. If the second character string is identical with a checking character string, in this case, the similarity degree is at a maximum, such that this checking character string is then selected as a correction character string.

According to a further embodiment of the method according to the invention, it is checked whether the second character string is a permissible character string, and the similarity degree is only determined when the result of the check is that the second character string is not a permissible character string. The method is thus advantageously accelerated, and the computing complexity is reduced.

According to a further embodiment of the method according to the invention, a first confidence degree is assigned to the first character string. When the second assignment of the second character string is carried out, a confidence degree of this second assignment is determined. In this case, the confidence degree of the second character string is lower than the confidence degree of the first character string. Further, the confidence degree of the second character string is determined depending on the input position that is assigned in the first assignment to the character that has been replaced in the second assignment, relative to the position of the input field that is assigned to the character that has been used in the second assignment.

The confidence degree specifies how probable it is that the user wanted to select the character of the respective character string. In the first assignment, it was assumed that the user wanted to input the character meant for the first character string with the respective input position. The first character string thus offers a higher confidence degree than the second character string, because otherwise the second character string would be the first character string. The confidence degree for the first character string can also fluctuate, however, depending on where the input position is arranged in the input field. If the input position is respectively always in the centre of the input fields, the recorded first character string offers a high confidence degree. If, however, the input position was on the outer edge of the input fields in at least some input fields, this leads to a reduction in the confidence degree for the first character string.

The confidence degree is correspondingly determined for the second character string. In this case too, it is taken into account how close an input field of a character of the second character string is to the input position. The closer the input field is to this input position, the higher the confidence degree of the corresponding second character string. Thus, if the input position of the input field selected for the first character string is on the edge of this input field, and specifically neighbouring another input field lying next to it, and if the character of this other input field is used as a replacement in the second character string, the confidence degree of this second character string is indeed lower than the confidence degree of the first character string. The reduction of the confidence degree, however, is not as great as when a character is used which is assigned to an input field which lies on the other side of the edge of the input field according to the first assignment, or which lies further away from this input field.

The confidence degree of the first character string is thus in particular determined depending on the input position that is assigned in the first assignment to the character that has been replaced in the second assignment, relative to the position of the input field of this character.

Thus advantageously, when determining the correction character string, not only can one similarity degree between the first character string or second character string and the checking character strings be determined and taken into account, but rather a confidence degree can be determined and taken into account, which is determined on the basis of measurements of input positions and the determination of the relative display positions of input fields.

According to a development of the method according to the invention, several second assignments are carried out, such that several second character strings are generated, and a confidence degree is respectively determined for each second character string.

The checking character string is selected as a correction character string in particular depending on the similarity degree and on the confidence degree. The higher the similarity degree of the checking character string, the more likely this checking character string is to be selected as the correction character string. This checking character string is furthermore more likely to be selected as a correction character string, the higher the confidence degree of the first or second character string. The confidence degree of the first character string or of the second character string thus has an influence on the selection of the checking character string. A confidence degree of the second character string, which is only slightly lower than the confidence degree of the first character string, can thus lead to a selection of a checking character string as a correction character string, and specifically if this checking character string has a higher similarity degree than another checking character string that has the highest similarity degree in a comparison with the first character string.

In general, for a pairing a first or second character string with a checking character string, a similarity degree and a confidence degree of the first or second character string can form the variables of a function, of which the functionality decides whether the corresponding checking character string of this pairing is selected as a correction character string.

According to a development of the method according to the invention, when the confidence degree is determined, the direction of a first vector from the central point of the input field of the character according to the first assignment to the input position is compared with the direction of a second vector from the central point of the input field according to the first assignment to the central point of the input field of the character according to the second assignment. The less the direction of the second vector differs from the direction of the vector, the higher the confidence degree of the second character string.

As an alternative or in addition, when determining the confidence degree, a first distance of the input position from the central point of the input field of the character according to the second assignment can be determined. The shorter the first distance, the higher the confidence degree of the second character string.

As an alternative or in addition, when determining the confidence degree, a second distance of the input position from the next edge point of the input field of the character according to the second assignment can be determined. The shorter the second distance, the higher the confidence degree of the second character string.

In this manner, the measured values of the input positions can be set in relation to the geometry of the input fields, in order to determine the confidence degree, and in this manner to come to an improved selection of a correction character string.

The input positions of the character string are in particular stored temporarily for so long that they can also be retrieved after the first assignment. The information about the input position is usually discarded as soon as a character has been assigned to the input position. In this case, however, the input positions can no longer be taken into account, in order to select improved correction character strings. Due to the temporary storage of the input positions, it is advantageously achieved that the input positions can also still be retrieved after the first assignment, in order to determine second character strings on the basis of these input positions, from which second character strings an improved selection of a correction character string can then be generated.

According to a development of the method according to the invention, the correction character string is output as an acceptable suggestion. If an input to accept the suggestion is recorded, the correction character string is selected as the input character string.

The device according to the invention, as has been described in the introduction, is characterised in that the correction unit is designed, when determining the correction character string, to carry out a second assignment, in which at least one character of the first assignment is replaced by another character according to the second assignment, such that a second character string is generated. The selection of the other character according to the second assignment is carried out depending on the display position of the input field of the other character relative to the associated recorded input position. The second character string is then the correction character string.

The device according to the invention is in particular designed to carry out the method according to the invention explained above. It thus has the same advantages as the method according to the invention.

According to a development of the device according to the invention, the latter has a checking unit coupled with the recording unit, said checking unit being designed to check whether the first character string is a permissible character string. The correction unit is then coupled with the checking unit and is designed only to determine the correction character string if the result of the check of the checking unit is that the first character string is not a permissible character string.

The correction unit of the device according to the invention is in particular designed, when the first character string is compared with checking character strings from a set of permissible character strings, to respectively determine a similarity degree and, when the second character string is compared with checking character strings from the set of permissible character strings, to respectively determine a similarity degree. The correction unit is further in particular designed to make a selection of one of the checking character strings as a correction character string depending on the similarity degree, wherein the higher the similarity degree of the checking character string, the more likely this checking character string is to be selected as the correction character string.

The similarity degree can for example only be determined when the result of the check is that the second character string is not a permissible character string. On the other hand, however, the similarity degree can also be determined when the result of the check is that the second character string is a permissible character string.

The correction unit can further be designed to determine a confidence degree, as was previously explained in relation to the method according to the invention.

BRIEF DESCRIPTION OF DRAWINGS

The invention is now explained on the basis of an exemplary embodiment with reference to the drawings.

DETAILED DESCRIPTION OF INVENTION

Figure 1:
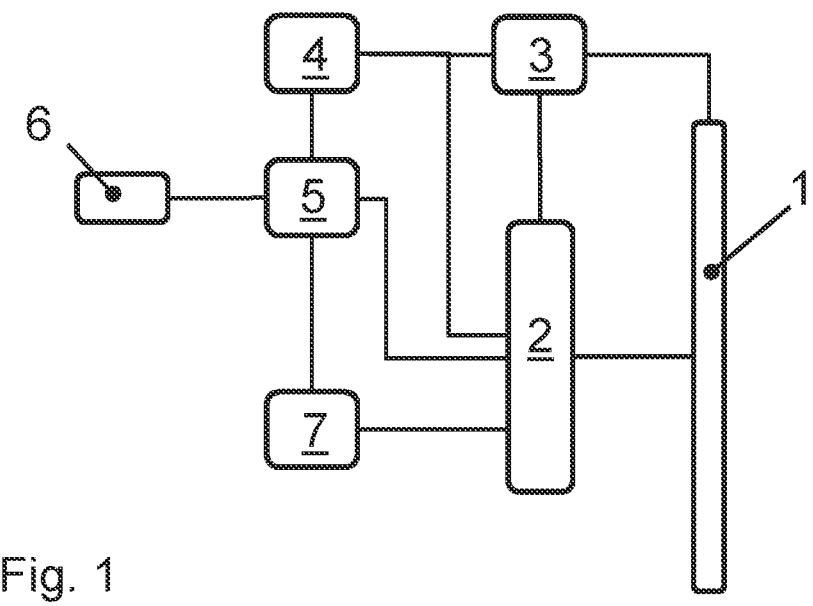
FIG. 1 schematically shows the structure of an exemplary embodiment of the device according to the invention.
Figure 2:
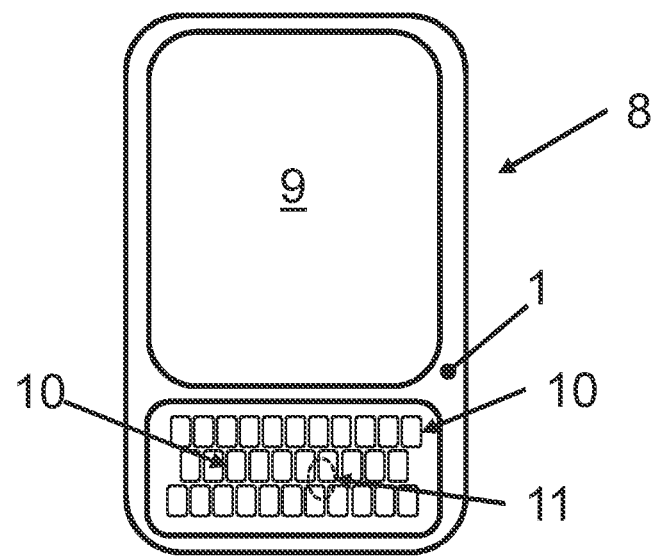
FIG. 2 shows the input device of the exemplary embodiment of the device according to the invention.

With reference to FIGS. 1 and 2, an exemplary embodiment of the device according to the invention is first explained:

As shown in FIG. 1, the device according to the invention comprises a touchscreen 1. The touchscreen 1 comprises a display surface and a touch-sensitive surface arranged on the display surface.

The touchscreen 1 is connected to a display control device 2 and to an input unit 3. The display control device 2 controls the display on the display surface of the touchscreen 1. The input unit 3 is also coupled with the display control device 2. It can cause the display control device 2 to display operable input fields 10 in a particular region of the display surface of the touchscreen 1, in which input fields selectable characters are displayed. Via these input fields 10, the user can make inputs, i.e., select characters, which are then displayed by means of the display control device 2 in a display region 9 of the touchscreen 1, as shown in FIG. 2.

By means of the touchscreen 1, an input position on the touchscreen can be assigned to an input of a user. For this purpose, the user can for example touch the surface of the touchscreen 1 with their fingertip in a touch region 11, as shown in FIG. 2. A touch is not necessarily required, however. It can be sufficient for the user to bring their fingertip or another operating object into the proximity of the touchscreen 1, such that an electromagnetic coupling, for example a capacitive coupling, is generated, via which the position of the fingertip or of the operating object can be recorded. Such touchscreens 1 are known per se.

The input unit 3 is designed to record the input region 11, and to assign it to an input position. These are in particular the x-y coordinates on the surface of the touchscreen 1.

The input unit 3 is coupled with a recording unit 4. The recording unit 4 is designed, in a first assignment, to assign each input position to a particular input field 10 in connection with the current display on the display surface of the touchscreen 1. A character is assigned to an input field 10, which is for example displayed within the input field 10. By the successive recording of characters, and by carrying out the first assignment, a first character string is recorded by means of the recording unit 4.

The recording unit 4 is coupled with the display control device 2. The display control device 2 can display the characters recorded by the recording unit 4 in the display region 9 of the touchscreen 1.

The recording unit 4 is additionally coupled with a checking device 5. The checking device 5 is designed to check whether the first character string transferred from the recording unit 4 is a permissible character string. For this purpose, the checking unit 5 is coupled with a data storage device 6. In the data storage device 6, a set with permissible character strings is stored, for example all the words of a particular language.

The checking unit 5 is coupled with the display control device 2. If the checking unit 5 has determined that the first character string is a permissible character string, the checking unit 5 of the display control device 2 can transfer a corresponding signal and the first character string, such that the first character string is reproduced in the display region 9 by means of the display control device 2.

The checking unit 5 is further coupled with a correction unit 7. The correction unit 7 is designed only to determine a permissible correction character string if the result of the check of the checking unit 5 is that the first character string is not a permissible character string. As is explained in more detail in the following, the correction unit 7 generates a correction character string, which is a permissible character string. The correction unit 7 is also coupled with the display control device 2, such that the correction unit 7 can transfer the correction character string to the display control device 2. By means of the display control device 2, the correction character string can then be output as an acceptable suggestion.

The touchscreen 1, the display control device 2, the input unit 3, the recording unit 4 are in particular integrated in an input device 8, for example a smartphone. The checking unit 5, the data storage device 6 and the correction unit 7 can also be integrated in the input device 8. However, these units can also be arranged outside of the input device 8, wherein in this case, a data interface is provided between the input device 8 and the externally arranged units. As an alternative, only the data storage device 6 can also be arranged outside of the input device 8.

As shown in FIG. 2, the input device 8 generates a display region 9 on the display surface of the touchscreen 1, in which display region the recorded first character strings can be displayed. In the display region 9, the correction character string can also further be displayed as a suggestion for replacing a first character string. As an alternative, several correction character strings can also be displayed for a first character string in the display region 9.

A keyboard having the input fields 10 is further displayed by the display surface of the touchscreen 1. In order to input a character of the input fields 10, the user can touch the touchscreen in the region of the keyboard in the touch region 11. An input field 10 and a character assigned to the input field 10 is then assigned to this touch region 11, as is later explained.

Figure 3:
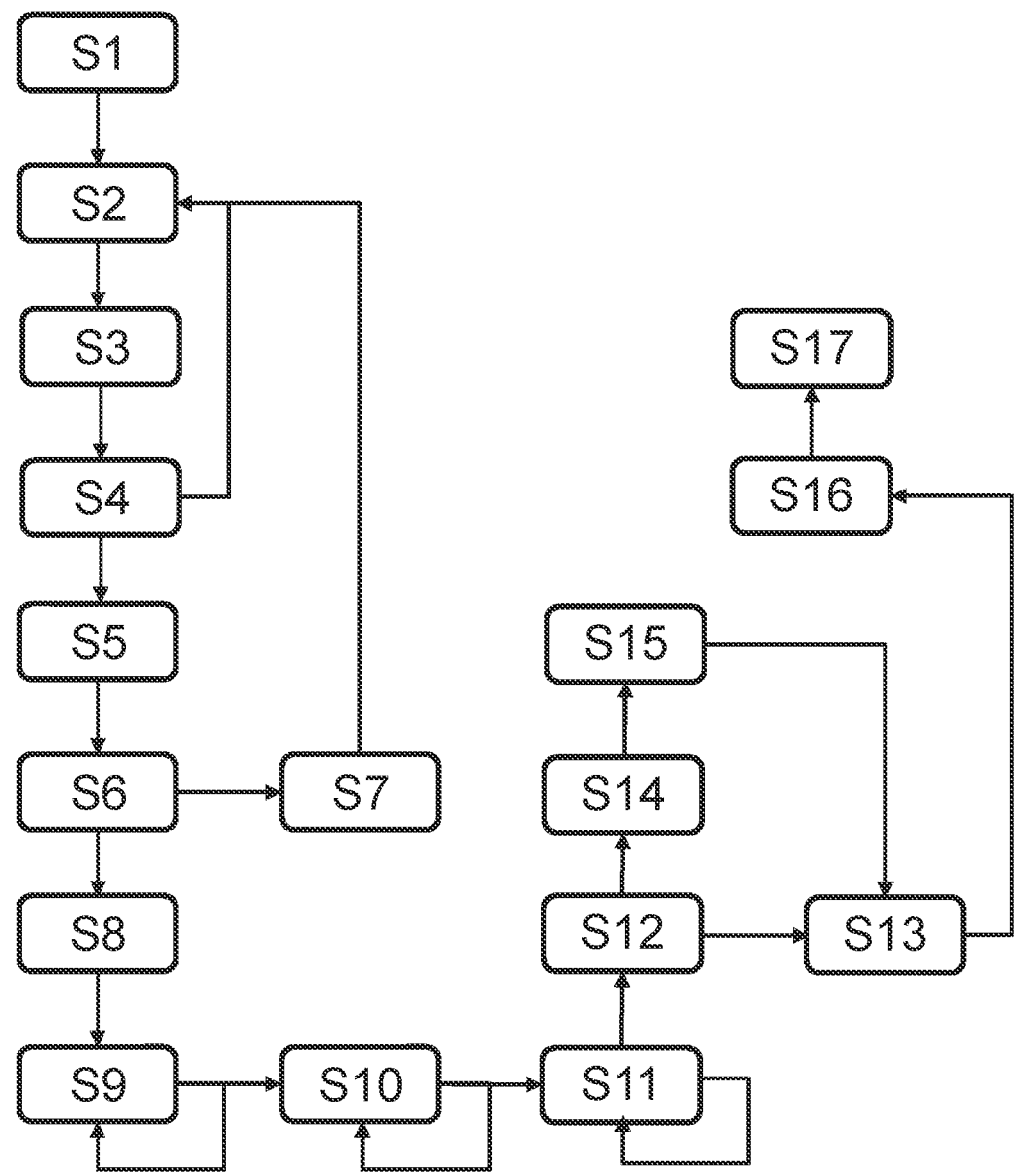
FIG. 3 shows the course of an exemplary embodiment of the method according to the invention.
Figure 4:
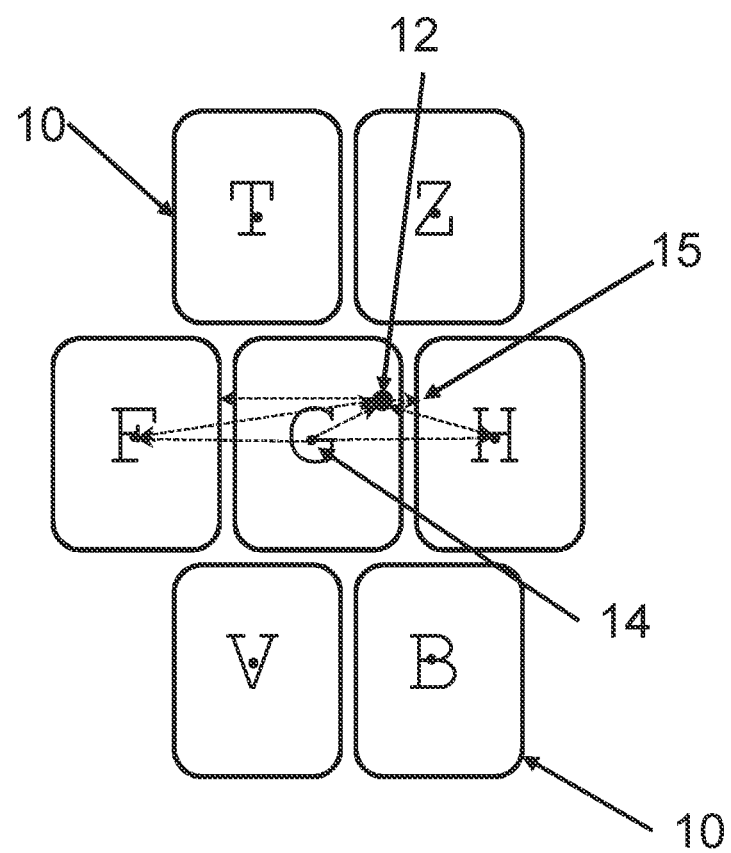
FIG. 4 depicts the assignment of an input position to an input field, as it is undertaken in the exemplary embodiment of the method according to the invention and the device according to the invention.

With reference to FIGS. 3 and 4, an exemplary embodiment of the method according to the invention is now explained, wherein further details of the device according to the invention are explained. The device according to the invention is in particular designed to carry out the method according to the invention.

In a step S1, a keyboard having a plurality of selectable characters in input fields 10 is displayed on the touchscreen in a step S1 by means of the input unit 3 and display control device 2. The character assigned to the input field 10 is displayed within the input field 10, such that the user can select the corresponding character by touching the touchscreen 1 in the region of the corresponding input field 10. The user now touches the touch-sensitive surface of the touchscreen 1 in a touch region 11, for example with their fingertip.

In a step S2, the surface of this touch region 11 is recorded by means of the input unit 3 on the touch-sensitive surface of the touchscreen 1.

In a step S3, an input position 12 (see FIG. 4) is calculated from this surface touch region 11. In the present exemplary embodiment, the input position 12 is the geometric central point or the geometric centre of gravity of the surface of the touch region 11. The input position 12 is temporarily stored.

In a step S4, an input field 10, and thus a displayed character, is assigned to the recorded input position 12 by means of the recording unit 4 in a first assignment. After the assignment of a character to an input position 12, this character is further output in the display region 9, such that the user recognises every character input directly in the display region 9.

Steps S2 to S4 are repeated until it results from the selected character that a character string has been completely input. If, for example, a space has been selected as a character, the result is that the previously selected characters should represent a completed word. In this case, the method continues with step S5, in which a first character string is generated from the first assignment of the recorded characters.

In a step S6, it is then checked whether the first character string is a permissible character string. For this purpose, the first character string is compared with checking character strings. The checking character strings are read from the data storage device 6. They are for example the permissible words of a language. If, in step S6, it has been determined that the first character string is a permissible character string, the first character string is transferred to the display control device 2, which causes the input device 8 to output the first character string as a completed character string on the touchscreen 1 in the display region 9 in a step S7.

The method then continues in step S2, such that a new character string can be input.

If the result of step S6 is that the first character string is a permissible character string, the method continues with step S8.

In an alternative exemplary embodiment, step S6 is omitted, and the method is also continued with step S8 if the first character string is a permissible character string. Regardless, however, the character string is output in step S7.

In step S8 and the following steps, a permissible correction character string is determined. A second assignment is carried out, in which at least one character of the first assignment is replaced by another character according to the second assignment, such that a second character string is generated. In order to explain how the second assignment is carried out, reference is additionally made in the following to FIG. 4.

In FIG. 4, different input fields 10 are represented, to which a selectable character, in the exemplary embodiment shown a letter, is respectively assigned. This letter is displayed within the input field 10. The touch position 12 determined from the touch region 11 is located in the example shown within the operating field 10 for the letter G. In the first assignment, the letter G is correspondingly selected for the touch region 11. As shown in FIG. 4, however, the touch position 12 is not located in the centre of the input field 10 for the letter G, and is instead near the edge.

In step S8, the geometry of the input fields 10, as shown on the touchscreen 1, is determined relative to the touch position 12. In the second assignment, the letter G of the first assignment is specifically replaced by another character, wherein the selection of this other character is carried out according to the second assignment, depending on the display position of the input field 10 of the other character relative to the assigned recorded input position 12.

For this purpose, in a step S9, the direction of a first vector from the central point 14 of the input field 10 of the character G according to the first assignment to the input position 12 is compared with the direction of a second vector from the central point 14 of the input field 10 according to the first assignment to the central point of the input field of the character according to the second assignment. A parameter for a confidence degree is determined from the comparison of the directions of these two vectors. The confidence degree specifies how probable it is that the user wanted to select the other character.

In the example according to FIG. 4, a confidence degree can thus be determined that the other character is the letter H or the letter F. The result is that the two vectors previously described for the input field 10 of the letter H have a lower direction deviation than the corresponding vectors which belong to the input field 10 of the letter F. From the central point 14 of the input field 10 for the letter G, the touch position 12 specifically lies more in the direction of the input field 10 for the letter H than in the direction of the input field 10 for the letter F. A higher confidence degree is correspondingly assigned to the letter H, which, according to the second assignment, replaces the letter G of the first assignment, than to the letter F. The confidence degree of the second character string is generally higher, the less the direction of the second vector deviates from the direction of the first vector.

When determining the confidence degree, a first distance of the input position 12 from the central point of the input field 10 of the character according to the second assignment is taken as a further parameter. As can be seen from FIG. 4, this parameter also leads to a higher confidence degree for the letter H than for the letter F. In general, the confidence degree of the second character string is higher, the shorter the first distance.

When determining the confidence degree, a second distance of the input position 12 from the next edge point 15 of the input field 10 of the character according to the second assignment is taken as another further parameter. In this case too, this leads to a higher confidence degree for the letter H in comparison with the confidence degree for the letter F, because the input position 12 is closer to the next edge point 15 of the input field 10 for the letter H than to the next edge point of the input field 10 for the letter F. The confidence degree of the second character string is higher, the shorter the second distance.

In this manner, in step S9, a confidence degree for the input of this character is carried out for each character in the vicinity of a character according to the first assignment. Step S9 is then repeated for all characters of the first character string, whereby a confidence degree is respectively determined for characters of neighbouring fields.

In step S10, a confidence degree is then also determined for each character of the first assignment for the first character string. The confidence degree of the characters of the first character string is determined depending on the input position 12 that is assigned in the first assignment to the character, relative to the position of the input field 10 of this character. The further away the input position 12 from the central point 14 of the input field 10 according to the first assignment, the lower the confidence degree of this character according to the first assignment. However, the confidence degree of the character according to the first assignment is always higher than the confidence degree of another character according to the second assignment, which replaces this character in the second assignment.

In the example according to FIG. 4, the confidence degree for the character G is thus reduced because the touch position 12 is not located directly in the centre of the operating field 10 for the character G, but rather on the edge of the input field 10 for the letter G. However, the confidence degree for the character H is lower than the confidence degree for the character G according to the first assignment, because otherwise the character H would have been selected in the first assignment. When step S10 finishes, the confidence degree is thus also present for each character of the first character string.

In step S11, a second assignment is carried out using the determined confidence degree. A character of the first assignment is replaced by another character, and specifically by the character for which the difference from the confidence degree of the character of the first character string that it would replace is lowest. The confidence degree of the second character string then results from the confidence degrees of the respective character of the second character string. In step S11, a further second character string or several further second character strings are determined in a corresponding manner, whereby a confidence degree is assigned to each second character string, said confidence degree depending on the confidence degree of the exchanged character.

In step S12, it is then checked whether the second character string or one of the second character strings is a permissible character string. If this is the case, the method is continued with step S13, and the permissible second character string is the correction character string. This correction character string is transferred to the display control device 2, which outputs it in the display region 9 as an acceptable suggestion for a replacement of the first character string.

If the second character string or none of the second character strings is a permissible character string, the method is continued with step S14.

In an alternative exemplary embodiment, steps S12 and S13 are omitted, and the method is also continued with step S14 if the second character string or one of the second character strings is a permissible character string.

A similarity comparison with checking character strings is carried out in step S14 for the first character string and the second character string or the second character strings, which checking character strings are stored as permissible character strings in the data storage device 6. This similarity check can be carried out for all character strings stored in the data storage device 6, or only for a partial set of these character strings. For each pairing of the first character string with a checking character string, a similarity degree for this checking character string is determined. A similarity degree is correspondingly determined for each pairing consisting of a second character string with a checking character string. The similarity degree can be determined in the same manner as is carried out in a conventional spelling correction. As an alternative or in addition, the similarity degree can be determined by a method as described in WO 2007/144199 A1.

In a step S15, a function is then applied to each checking character string, which takes the similarity degree of this checking character string and the confidence degree of the first or second character string, with which the corresponding checking character string is compared, as a variable. The higher the similarity degree, and the higher the corresponding confidence degree, the higher the value of this function. The checking character string having the highest function value is then selected as the correction character string in step S15.

The method then continues with step S13, in which the correction character string is transferred to the display control device 2, which controls the touchscreen 1, such that it outputs the correction character string in the display region 9 as an acceptable suggestion for a replacement of the first character string.

Starting from step S13, the method continues with step S16. In step S16, a potential input to accept the output suggestion is recorded. If an input to accept the suggestion has been recorded, then in step S17, the first character string is replaced by the correction character string and is correspondingly displayed in the display region 9.

In a further exemplary embodiment, the checking character string is determined only using the similarity degree, and the steps relating to the confidence degree are not carried out. The checking character string which has the highest similarity degree is then selected as a correction character string.

For further explanation, it is explained, also with reference to the example depicted in FIG. 4, how the correction character string is determined in the method according to the invention and the device according to the invention.

In the following, it is supposed that the user wanted to input the following character string as a target character string:

HALB (English: HALF)

For the first letter H, however, the user has not touched the input field 10 for the letter H, but instead the touch region 11, and thus the touch position 12 was, as shown in FIG. 4, in the input field 10 for the letter G. The following first character string has thus been recorded:

GALB

The confidence degree for this first character string is 0.9, because the input position 12 is not in the centre of the input field 10 for the letter G. It is assumed that the input positions 12 for the further letters A L B were respectively in the centre of the corresponding input fields for these letters.

In the method, it is now determined that the first character string GALB is not a permissible character string. A different two character strings are thus determined, the respective confidence degrees are determined, and the first character string GALB and the determined second character strings are compared with several checking character strings, which are stored in the data storage device 6 as permissible character strings.

The similarity degree of the first character string GALB with different checking character strings results from the following table:

| Checking character strings | Similarity degree |
|---|---|
| HALB (English: HALF) | 0.6 (one character different, first character different) |
| GELB (English: YELLOW) | 0.8 (one character different) |
| KALB (English: CALF) | 0.6 (one character different, first character different) |
| LAUB (English: FOLIAGE) | 0.4 (two characters different, first character different) |
| GAST (English: GUEST) | 0.45 (two characters different) |

In addition, as explained above, several second character strings are determined. The following second character string is determined as the first second character string:

HALB (English: HALF)

As has been explained above with reference to FIG. 4, in this case, the letter G of the first character string has been replaced by the letter H. The confidence degree of this second character string is 0.8. It is lower than the confidence degree for the first character string. This second character string is preferably compared with the same checking character strings as the first character string. A similarity degree is respectively determined for a pairing of the second character strings with a checking character string. This similarity degree is shown in the following table:

| Checking character strings | Similarity degree |
|---|---|
| HALB (English: HALF) | 1 (identical) |
| GELB (English: YELLOW) | 0.4 (two characters different, first character different) |
| KALB (English: CALF) | 0.6 (one character different, first character different) |
| LAUB (English: FOLIAGE) | 0.4 (two characters different, first character different) |
| GAST (English: GUEST) | 0.3 (three characters different) |

A similarity degree of 1 results for the checking character string HALB (English: HALF), because this checking character string is identical with the second character string. In the method according to the invention, this would already cause this second character string to be output as the correction character string.

However, even if the similarity degree due to the identity of the character string were not 1, but a little lower than this maximum similarity degree, the value of the function described above for the checking character string HALB (English: HALF) would be higher overall than the value of the function for the checking character string GELB (English: YELLOW), which has the highest similarity degree in comparison with the first character string. For this reason, in this case too, the checking character string HALB (English: HALF) will be output as a correction suggestion instead of the checking character string GELB (English: YELLOW).

As a further second character string, as shown in FIG. 4, the letter F could also replace the letter G, because it is also arranged next to the operating field 10 for the letter G. In this case, the second character string would be the following:

FALB (English: FAWN)

The confidence degree for this second character string would be 0.6, for example. It is lower than the confidence degree for the second character string HALB, because the input field 10 for the letter F is further away from the touch position 12 than the input field 10 for the letter H.

In this case too, the similarity degree for this second character string is determined with checking character strings. The result is represented in the following table:

| Checking character strings | Similarity degree |
|---|---|
| HALB (English: HALF) | 0.6 (one character different, first character different) |
| GELB (English: YELLOW) | 0.4 (two characters different, first character different) |
| KALB (English: CALF) | 0.6 (one character different, first character different) |
| LAUB (English: FOLIAGE) | 0.4 (two characters different, first character different) |

As a result, no higher value will result for the function described above having the variables of the similarity degree and the confidence degree, such that even if this further second character string is taken into account, HALB is output as a correction character string.

LIST OF REFERENCE NUMERALS 1 touchscreen
2 display control device
3 input unit
4 recording unit
5 checking unit
6 data storage device
7 correction unit
8 input device
9 display region
10 input fields
11 touch region
12 touch position
13 central surface
14 central point of an input field
15 edge point of an input field

What is claimed is:

1. A method for inputting a character string, the method comprising:
displaying a plurality of selectable characters in input fields on a touchscreen,
successively recording input positions on the touchscreen, and, in a first assignment, assigning each input position to a displayed character, such that a first character string is recorded,
determining a correction character string for the first character string, wherein
when determining the correction character string, a second assignment is carried out, in which at least one character of the first assignment is replaced by another character according to the second assignment, such that a second character string is generated,
wherein the selection of the other character according to the second assignment is carried out depending on the display position of the input field of the other character relative to the associated recorded input position, and the second character string is the correction character string,
assigning the first character string a confidence degree,
when the second assignment of the second character string is carried out, determining a confidence degree of this second assignment,
wherein the confidence degree of the second character string is lower than the confidence degree of the first character string,
wherein the confidence degree of the second character string is determined depending on the input position that is assigned in the first assignment to the character that has been replaced in the second assignment, relative to the position of the input field that is assigned to the character that has been used in the second assignment, and
wherein the confidence degree of the first character string is determined depending on the input position that is assigned in the first assignment to the character that has been replaced in the second assignment, relative to the position of the input field of this character.

2. A method for inputting a character string, the method comprising:
displaying plurality of selectable characters in input fields on a touchscreen,
successively recording input positions on the touchscreen, and, in a first assignment, assigning each input position to a displayed character, such that a first character string is recorded, and
determining a correction character string for the first character string,
wherein
when determining the correction character string, a second assignment is carried out, in which at least one character of the first assignment is replaced by another character according to the second assignment, such that a second character string is generated,
wherein the selection of the other character according to the second assignment is carried out depending on the display position of the input field of the other character relative to the correction character string,
when the first character string is compared with checking character strings from a set of permissible character strings, a similarity degree is respectively determined, and when the second character string is compared with checking character strings from the set of permissible character strings, a similarity degree is respectively determined,
one of the checking character strings is selected as a correction character string depending on the similarity degree, wherein the higher the similarity degree of the checking character string, the more likely this checking character string is to be selected as the correction character string, and the checking character string is selected as a correction character string depending on the similarity degree and on the confidence degree, wherein the higher the similarity degree of the checking character string, the more likely this checking character string is to be selected as the correction character string, and the higher the confidence degree of the first or second character string with which the checking character string has been compared, the more likely this checking character string is to be selected as the correction character string.

3. A method for inputting a character string, the method comprising:
displaying a plurality of selectable characters in input fields on a touchscreen,
successively recording input positions on the touchscreen, and, in a first assignment, assigning each input position to a displayed character, such that a first character string is recorded,
determining a correction character string for the first character string,
wherein
when determining the correction character string, a second assignment is carried out, in which at least one character of the first assignment is replaced by another character according to the second assignment, such that a second character string is generated,
wherein the selection of the other character according to the second assignment is carried out depending on the display position of the input field of the other character relative to the associated recorded input position, and the second character string is the correction character string,
assigning the first character string a confidence degree,
when the second assignment of the second character string is carried out, determining a confidence degree of this second assignment,
wherein the confidence degree of the second character string is lower than the confidence degree of the first character string,
wherein the confidence degree of the second character string is determined depending or the input position that is assigned in the first assignment to the character that has been replaced in the second assignment, relative to the position of the input field that is assigned to the character that has been used in the second assignment, and
when the confidence degree is determined, the direction of a first vector from the central point of the input field of the character according to the first assignment to the input position is compared with the direction of a second vector from the central point of the input field according to the first assignment to the central point of the input field of the character according to the second assignment,
the less the direction of the second vector differs from the direction of the first vector, the higher the confidence degree of the second character string.

4. A method for inputting a character string, the method comprising:
displaying a plurality of selectable characters in input fields on a touchscreen,
successively recording input positions on the touchscreen, and, in a first assignment, assigning each input position to a displayed character, such that a first character string is recorded, determining a correction character string for the first character string, wherein when determining the correction character string, a second assignment is carried out, in which at least one character of the first assignment is replaced by another character according to the second assignment, such that a second character string is generated, wherein the selection of the other character according to the second assignment is carried out depending on the display position of the input field of the other character relative to the associated recorded input position, and the second character string is the correction character string, assigning the first character string a confidence degree, when the second assignment of the second character string is carried out, determining a confidence degree of this second assignment, wherein the confidence degree of the second character string is lower than the confidence degree of the first character string, wherein the confidence degree of the second character string is determined depending or the input position that is assigned in the first assignment to the character that has been replaced in the second assignment, relative to the position of the input field that is assigned to the character that has been used in the second assignment, and when determining the confidence degree, a first distance of the input position from the central point of the input field of the character according to the second assignment is determined, the shorter the first distance, the higher the confidence degree of the second character string.

5. A method for inputting a character string, the method comprising:

displaying a plurality of selectable characters in input fields on a touchscreen, successively recording input positions on the touchscreen, and, in a first assignment, assigning each input position to a displayed character, such that a first character string is recorded, determining a correction character string for the first character string, wherein when determining the correction character string, a second assignment is carried out, in which at least one character of the first assignment is replaced by another character according to the second assignment, such that a second character string is generated, wherein the selection of the other character according to the second assignment is carried out depending on the display position of the input field of the other character relative to the associated recorded input position, and the second character string is the correction character string, assigning the first character string a confidence degree, when the second assignment of the second character string is carried out, determining a confidence degree of this second assignment, wherein the confidence degree of the second character string is lower than the confidence degree of the first character string, wherein the confidence degree of the second character string is determined depending or the input position that is assigned in the first assignment to the character that has been replaced in the second assignment, relative to the position of the input field that is assigned to the character that has been used in the second assignment, and when determining the confidence degree, a second distance of the input position from the next edge point of the input field of the character according to the second assignment is determined, the shorter the second distance, the higher the confidence degree of the second character string.

6. A device for inputting a character string, the device comprising:

a touchscreen, an input unit coupled with the touchscreen, which is designed to display a plurality of selectable characters in input fields on the touchscreen, and to successively record input positions on the touchscreen, a recording unit which is coupled with the input unit and which is designed, in a first assignment, to assign each input position to a displayed character in order to record a first character string, and a correction unit, which is designed to determine a correction character string, wherein when determining the correction character string, the correction unit is designed to carry out a second assignment, in which at least one character of the first assignment is replaced by another character according to the second assignment, such that a second character string is generated, wherein the selection of the other character according to the second assignment is carried out depending on the display position of the input field of the other character relative to the associated recorded input position, and the second character string is the correction character string, assigning the first character string a confidence degree, when the second assignment of the second character string is carried out, determining a confidence degree of this second assignment, wherein the confider second character string is lower than the confidence degree of the first character string, wherein the confidence degree of the second character string is determined depending on the input position that is assigned in the first assignment to the character that has been replaced in the second assignment, relative to the position of the input field that is assigned to the character that has been used in the second assignment, and wherein the confidence degree of the first character string is determined depending on the input position that is assigned in the first assignment to the character that has been replaced in the second assignment, relative to the position of the input field of this character.

7. A device for inputting a character string, the device comprising:

a touchscreen, an input unit coupled with the touchscreen, which is designed to display a plurality of selectable characters in input fields on the touchscreen, and to successively record input positions on the touchscreen, a recording unit which is coupled with the input unit and which is designed, in a first assignment, to assign each input position to a displayed character in order to record a first character string, and a correction unit, which is designed to determine a correction character string, wherein when determining the correction character string, the correction unit is designed to carry out a second assignment, in which at least one character of the first assignment is replaced by another character according to the second assignment, such that a second character string is generated, wherein the selection of the other character according to the second assignment is carried out depending on the display position of the input field of the other character relative to the associated recorded input position, and the second character string is the correction character string, the correction unit is designed, when the first character string is compared with checking character strings from a set of permissible character strings, to respectively determine a similarity degree, and when the second character string is compared with checking character strings from the set of permissible character strings, to respectively determine a similarity degree, and to make a selection of one of the checking character strings as a correction character string depending on the similarity degree, wherein the higher the similarity degree of the checking character string, the more likely this checking character string is to be selected as the correction character string, and the checking character string is selected as a correction character string depending on the similarity degree and on the confidence degree, wherein the higher the similarity degree of the checking character string, the more likely this checking character string is to be selected as the correction character string, and the higher the confidence degree of the first or second character string with which the checking character string has been compared, the more likely this checking character string is to be selected as the correction character string.

8. A device for inputting a character string, the device comprising:

a touchscreen, an input unit coupled with the touchscreen, which is designed to display a plurality of selectable characters in input fields on the touchscreen, and to successively record input positions on the touchscreen, a recording unit which is coupled with the input unit and which is designed, in a first assignment, to assign each input position to a displayed character in order to record a first character string, and a correction unit, which is designed to determine a correction character string, wherein when determining the correction character string, the correction unit is designed to carry out a second assignment, in which at least one character of the first assignment is replaced by another character according to the second assignment, such that a second character string is generated, wherein the selection of the other character according to the second assignment is carried out depending on the display position of the input field of the other character relative to the associated recorded input position, and the second character string is the correction character string, assigning the first character string a confidence degree, when the second assignment of the second character string is carried out, determining a confidence degree of this second assignment, wherein the confidence degree of the second character string is lower than the confidence degree of the first character string, wherein the confidence degree of the second character string is determined depending on the input position that is assigned in the first assignment to the character that has been replaced in the second assignment, relative to the position of the input field that is assigned to the character that has been used in the second assignment, and when the confidence degree is determined, the direction of a first vector from the central point of the input field of the character according to the first assignment to the input position is compared with the direction of a second vector from the central point of the input field according to the first assignment to the central point of the input field of the character according to the second assignment, the less the direction of the second vector differs from the direction of the first vector, the higher the confidence degree of the second character string.

9. A device for inputting a character string, the device comprising:

a touchscreen, an input unit coupled with the touchscreen, which is designed to display a plurality of selectable characters in input fields on the touchscreen, and to successively record input positions on the touchscreen, a recording unit which is coupled with the input unit and which is designed, in a first assignment, to assign each input position to a displayed character in order to record a first character string, and a correction unit, which is designed to determine a correction character string, wherein when determining the correction character string, the correction unit is designed to carry out a second assignment, in which at least one character of the first assignment is replaced by another character according to the second assignment, such that a second character string is generated, wherein the selection of the other character according to the second assignment is carried out depending on the display position of the input field of the other character relative to the associated recorded input position, and the second character string is the correction character string, assigning the first character string a confidence degree, when the second assignment of the second character string is carried out, determining a confidence degree of this second assignment, wherein the confidence degree of the second character string is lower than the confidence degree of the first character string, wherein the confidence degree of the second character string is determined depending on the input position that is assigned in the first assignment to the character that has been replaced in the second assignment, relative to the position of the input field that is assigned to the character that has been used in the second assignment, when determining the confidence degree, a first distance of the input position from the central point of the input field of the character according to the second assignment is determined, and the shorter the first distance, the higher the confidence degree of the second character string.

10. A device for inputting a character string, the device comprising:

a touchscreen, an input unit coupled with the touchscreen, which is designed to display a plurality of selectable characters in input fields on the touchscreen, and to successively record input positions on the touchscreen, a recording unit which is coupled with the input unit and which is designed, in a first assignment, to assign each input position to a displayed character in order to record a first character string, and a correction unit, which is designed to determine a correction character string, wherein when determining the correction character string, the correction unit is designed to carry out a second assignment, in which at least one character of the first assignment is replaced by another character according to the second assignment, such that a second character string is generated, wherein the selection of the other character according to the second assignment is carried out depending on the display position of the input field of the other character relative to the associated recorded input position, and the second character string is the correction character string, assigning the first character string a confidence degree, when the second assignment of the second character string is carried out, determining a confidence degree of this second assignment, wherein the confidence degree of the second character string is lower than the confidence degree of the first character string, wherein the confidence degree of the second character string is determined depending on the input position that is assigned in the first assignment to the character that has been replaced in the second assignment, relative to the position of the input field that is assigned to the character that has been used in the second assignment, when determining the confidence degree, a second distance of the input position from the next edge point of the input field of the character according to the second assignment is determined, and the shorter the second distance, the higher the confidence degree of the second character string.

\* \* \* \* \*